W. T. NICHOLSON.
Level.
No. 28,104.
Patented May 1, 1860.
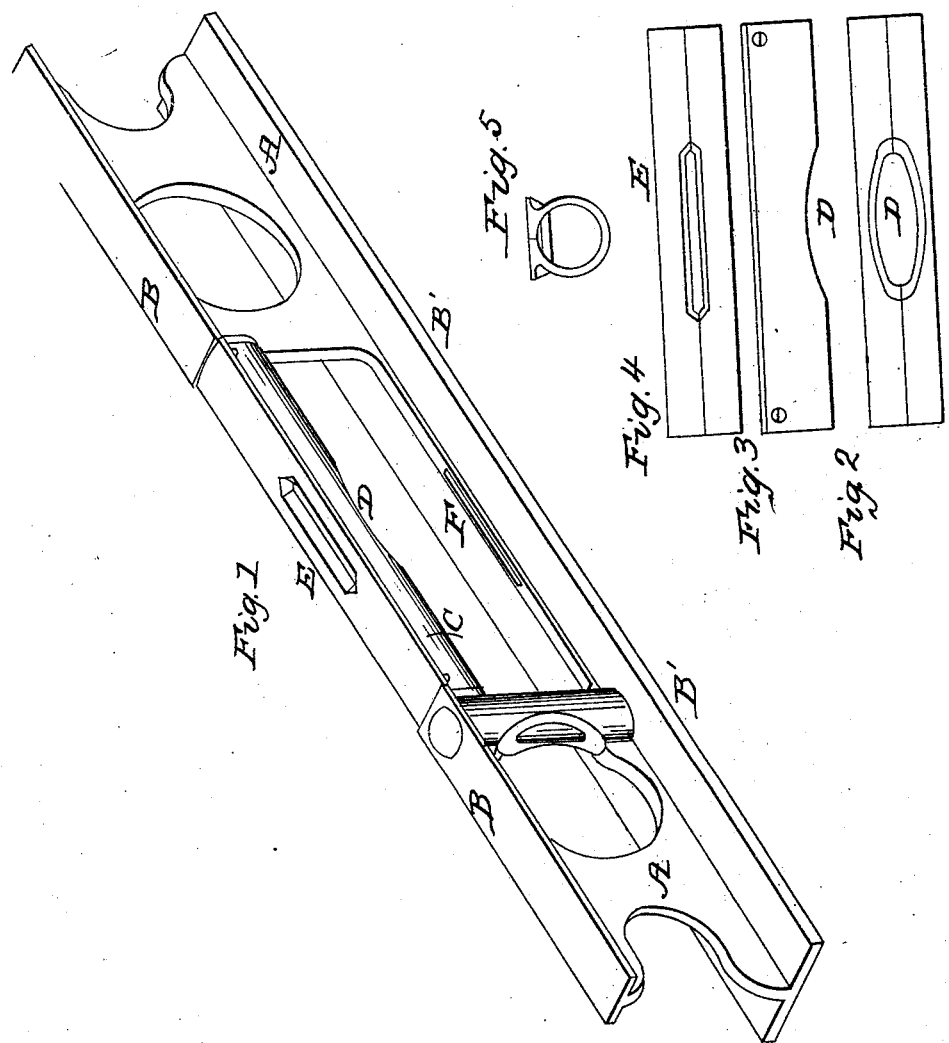

UNITED STATES PATENT OFFICE.

WILLIAM T. NICHOLSON, OF PROVIDENCE, RHODE ISLAND.

SPIRIT-LEVEL.

Specification of Letters Patent No. 28,104, dated May 1, 1860.

*To all whom it may concern:*

Be it known that I, WILLIAM T. NICHOLSON, of the city and county of Providence, in the State of Rhode Island, have invented a new and useful Improvement in Spirit-Levels; and I do hereby declare that the following specification, taken in connection with the drawings making a part of the same, is a full, clear, and exact description thereof.

Figure 1, exhibits a perspective view of the whole instrument. Figs. 2, 3, 4, and 5, are different views of a protecting sheath presently to be described.

My improvement consists in the use of a protecting sheath or case so arranged that when the level is not in use the glass which contains the fluid can be inclosed and thereby be protected from injury and I also so construct the instrument that it can be used to determine the horizontality of objects so situated, (as for example a line of shafting) that it is more convenient to apply the instrument to the under instead of to the upper side.

A A Fig. 1, represents a frame of cast iron or of any other material suitable for the purpose required. The two faces B B' are made perfectly parallel with each other and the glass spirit tube containing the bubble of air is properly mounted in a stationary metallic bed which forms a part of the frame.

The stationary bed in which the spirit tube is mounted has a portion of its upper surface cut away so that the bubble as it traverses from one end of the tube to the other can be observed. Around this stationary bed as an axis I place a metallic sheath or case, C, (different views of which are given at Figs. 2, 3, 4, 5) in which are two openings D, Fig. 2, and E, Fig. 4, opposite each other. When the instrument is in use the sheath is adjusted so that the opening D shall be over the bubble and when not in use it can be turned around its axis sufficiently far to completely inclose the glass and protect it from injury.

The object in having the two openings D, and E, in the sheath as also the corresponding openings in the bed in which the spirit tube is mounted is to admit the passage of light through the tube for the purpose, in connection with the means presently to be described, of rendering the instrument useful in determining the horizontality of the under side of any object to which it is applied.

F (Fig. 1) is a slot or opening cut through the underside of the frame and directly beneath the axis of the spirit tube. If now the sheath be so adjusted as to admit the light through the tube and the instrument be placed with the upper side against any object overhead, by applying the eye to the opening, F, the position of the bubble can be observed as easily and as accurately as if the instrument were applied like an ordinary level to the upper side of the object.

What I claim as my invention and desire to secure by Letters Patent is—

The improvement in the article of manufacture described consisting of the use of a protecting sheath or its equivalent in combination with the fluid tube of a mechanic's level substantially as described.

In witness whereof I have hereunto subscribed my name this sixteenth day of March A. D. 1860.

WM. T. NICHOLSON.

Witnesses:
WM. S. HOYT,
J. N. MOORE.